Patented Dec. 9, 1941

2,265,640

UNITED STATES PATENT OFFICE 2,265,640

COPOLYMERS OF VINYL COMPOUNDS AND UNSATURATED ALLYL ESTERS AND ETHERS

Benjamin S. Garvey, Akron, and Claude H. Alexander, Cuyahoga Falls, Ohio, assignors to The B. F. Goodrich Company, New York, N. Y., a corporation of New York No Drawing. Application June 23, 1938, Serial No. 215,408

8 Claims. (Cl. 260—86)

This invention relates to the polymerization of olefinic compounds and in particular to the formation of mixed polymers having improved physical properties.

The commercial utility of resins like polyvinyl acetate or polystyrene is considerably limited by their plasticity at elevated temperatures, especially when they have been plasticized to decrease their brittleness at low temperatures. Considerations arising from a study of the vulcanization of rubber suggested that this thermoplasticity could be overcome by the formation of bridges between the chain molecules of the polymers.

That this was so was demonstrated by reacting succinic acid with polyvinyl acetate so that it replaced some of the acetic acid in the polymer. The succinic acid could combine with two of the chain molecules and form a bridge between them. The resulting product was much less thermoplastic than the original polyvinyl acetate. Exchange reactions of this type offer several technical difficulties. The reaction involves an equilibrium and its completion requires removal of the molecule eliminated; in this case, acetic acid. Removal from the mass becomes progressively more difficult as its plasticity diminishes, and frequently leaves a blown, porous product. Furthermore the reaction is slow and requires a high temperature.

We have now found that similar results can be obtained by polymerizing mixtures of two different polymerizable compounds, such as mixtures of vinyl acetate and diallyl succinate. The mixed polymers are not soluble in the usual solvents. They are thermoelastic rather than thermoplastic. That is to say, the product which is hard at room temperatures does not become plastic and flow at a higher temperature but becomes flexible and elastic like vulcanized rubber. In a similar manner the usual plasticizers tend to make these mixed polymers elastic rather than plastic.

The essential character of all of these mixtures is that one component is a compound which contains the polymerizable group C=CH₂ and contains no other polymerizable group, and that a second component is a compound which contains the polymerizable

and, in addition, at least one other polymerizable olefinic double bond separated therefrom by at least one intervening atom. Typical compounds of the first class are: vinyl esters of saturated monobasic acids such as the halogen acids, acetic acid, chloracetic acid, propionic acid, or benzoic acid; acrylic acid or substituted acrylic acids and their esters with monohydric alcohols; monovinyl (or monoisopropenyl) aromatic compounds such as styrene, vinyl naphthalene, isopropenyl benzene, or vinyl phenol; methyl vinyl or methyl isopropenyl ketones; and vinyl alkyl ethers. Typical compounds of the second class are: vinyl or allyl esters of acrylic or crotonic acids; divinyl ether or the polyvinyl ethers of polyhydric alcohols such as glycol or diethylene glycol as well as diallyl ether. These compounds all polymerize readily and completely to form products which are essentially chemically saturated and stable, and which have desirable chemical properties.

It is important for the purpose of this invention that the double bonds in the compounds of the second class be unconjugated, that is, that the two (or more) double bonds be separated by at least one intervening atom. Conjugated dienes such as butadiene tend to polymerize in such a manner that only one double bond disappears, to produce linear polymers which are still chemically unsaturated and more or less soluble and plastic. Mixed polymers of such conjugated dienes with compounds of the first class referred to above similarly remain plastic even when the diene forms as much as 40 or 50% of the product. On the other hand, in the unconjugated compounds of our second class the double bonds can polymerize independently and are therefore capable of entering separate polymer chains so that the compound forms a bridge or link joining the chains. Only a small proportion of such a compound is required to form a sufficient number of bridges to restrain relative movement of the polymer chains.

Any of the compounds in the first class can be polymerized with any of the compounds in the second class by known methods of polymerization such as heating or exposing to actinic light, with or without catalysts, to give products which have lower thermoplasticity and better resistance to solvents than polymers made from compounds of the first class alone.

The properties of the mixed polymers vary widely depending on the proportions of the polymerizable compounds. If vinyl acetate is polymerized with as little as 0.1% of allyl crotonate, the polymer is almost insoluble but is somewhat thermoplastic. It can be milled on a rubber mill and molded in a press. With larger proportions of allyl crotonate the polymer is no longer soluble or thermoplastic. When heated it becomes flexible and elastic. On a hot rubber mill it is ground to a fluffy powder.

This improvement in the properties of normally soluble and thermoplastic polymers very materially extends their usefulness. Those polymers containing about 0.1% or less of allyl crotonate can be used as molding plastics. They will still have good physical properties at temperatures at which pure polyvinyl acetate is liquid. They can be molded at high pressures and removed from the hot mold, eliminating the need for cooling the molds and thus speeding up production. The lowered sensitivity to temperature changes permits the use of more plasticizer and hence a wider range of mechanical properties in the finished product. The resistance to solvents permits their use in many places where the pure polyvinyl acetate would be useless.

The products containing more than 1% of allyl crotonate can be sawed, cut, turned and polished. If polymerized in the form of sheets, tubes, rods, or special shapes they can be worked by the methods usually applied to cast plastics.

To illustrate the variation in properties of these mixed polymers, vinyl acetate may be mixed with one-twentyfifth, one-tenth, one, and three per cent of allyl crotonate, one per cent of benzoyl peroxide being added in each instance, and heated in completely filled iron flasks for 90 hours at 35° C., the soft flexible polymers being removed from the flasks and hardened by heating in air for 15 to 30 minutes at 100 to 120° C. A product prepared in this manner from vinyl acetate alone is hard at room temperature but is so soft at 120° C. as to be almost liquid, and is easily soluble in acetone; whereas the products containing allyl crotonate are equally hard at room temperature but much less plastic and soluble, the product containing one-twentyfifth per cent being a soft plastic at 120° C. and dissolving slowly in acetone, the product containing one-tenth per cent being still plastic at 120° C. but only partly soluble in acetone, and those containing one or three per cent being elastic but not plastic at 120° C. and swelling somewhat in acetone without dissolving.

A similar improvement in the properties of other polymers can be obtained in the same way. Thus, we can use any of the following mixtures: vinyl ethyl ether and divinyl ether; styrene and divinyl ether; vinyl acetate and allyl crotonate.

Coloring materials, plasticizers and pigments may be added to the polymers in those cases in which the polymers are still somewhat plastic and soluble or in case the coloring materials, plasticizers, etc. are capable of diffusing into the polymers. Such materials in so far as they do not inhibit polymerization may also be incorporated in the mixture before polymerization. For example, a product which is non-thermoplastic but still somewhat resilient may be obtained by polymerizing a mixture of 90 parts of vinyl acetate, 1 part of allyl crotonate, and 9 parts of tricresyl phosphate containing 1% of benzoyl peroxide.

It is obvious from the description and examples that many modifications can be made without departing from the spirit of the invention. Various compounds containing one polymerizable group, or mixtures of them, can be polymerized with different compounds containing two or more polymerizable groups, or mixtures of them, with or without the addition of other ingredients to give a wide variety of chemical and physical properties to the polymers. Variations in properties can be controlled at will.

This application is a continuation in part of our co-pending application Serial No. 77,608, filed May 2, 1936.

We claim:

1. A process which comprises polymerizing a compound containing the polymerizable group

and no other polymerizable group in the presence of small quantities of an aliphatic compound containing an allyl group and one additional polymerizable double bond separated therefrom at least by an oxygen atom and not containing more than three oxygen atoms in the molecule.

2. A process which comprises polymerizing aliphatic vinyl compounds containing a single vinyl group and no other polymerizable group in the presence of small quantities of an aliphatic compound containing an allyl group and one additional polymerizable double bond separated therefrom at least by an oxygen atom and not containing more than three oxygen atoms in the molecule.

3. A process which comprises polymerizing aliphatic vinyl compounds containing a single vinyl group and no other polymerizable group in the presence of small quantities of diallyl ether.

4. A process which comprises polymerizing aliphatic vinyl compounds containing a single vinyl group and no other polymerizable group in the presence of small quantities of allyl crotonate.

5. A product which includes a copolymer of a compound containing the polymerizable group

and no other polymerizable group, and an aliphatic compound containing an allyl group and one additional polymerizable double bond separated therefrom at least by an oxygen atom and not containing more than three oxygen atoms in the molecule.

6. A product which includes a copolymer of aliphatic vinyl compounds containing a single vinyl group and no other polymerizable group and diallyl ether.

7. A product which includes a copolymer of aliphatic vinyl compounds containing a single vinyl group and no other polymerizable group and allyl crotonate.

8. A product which includes a copolymer of aliphatic vinyl compounds containing a single vinyl group and no other polymerizable group, and an aliphatic compound containing an allyl group and one additional polymerizable double bond separated therefrom at least by an oxygen atom and not containing more than three oxygen atoms in the molecule.

BENJAMIN S. GARVEY.
CLAUDE H. ALEXANDER.